US008531517B2

(12) United States Patent
Tao

(10) Patent No.: US 8,531,517 B2
(45) Date of Patent: Sep. 10, 2013

(54) IV MONITORING BY VIDEO AND IMAGE PROCESSING

(75) Inventor: Kai Tao, Yizheng (CN)

(73) Assignee: Kai Tao, Wan Nian Xin Cun, Yizheng, Jiangsu (CN)

( * ) Notice: Subject to any disclaimer, the term of this patent is extended or adjusted under 35 U.S.C. 154(b) by 409 days.

(21) Appl. No.: 12/804,163

(22) Filed: Jul. 15, 2010

(65) Prior Publication Data
US 2012/0013735 A1 Jan. 19, 2012

(51) Int. Cl.
*H04N 7/00* (2011.01)
*H04N 7/18* (2006.01)
*G06K 9/46* (2006.01)
G06K 9/40 (2006.01)
G06K 9/56 (2006.01)

(52) U.S. Cl.
USPC ........... 348/135; 348/169; 382/107; 382/204; 382/205; 382/266; 382/274

(58) Field of Classification Search
USPC ................................. 604/253, 251
See application file for complete search history.

(56) References Cited

U.S. PATENT DOCUMENTS

| | | | | | |
|---|---|---|---|---|---|
| 2,880,764 | A | * | 4/1959 | Pelavin | 141/130 |
| 4,383,252 | A | * | 5/1983 | Purcell et al. | 340/606 |
| 4,577,197 | A | * | 3/1986 | Crean et al. | 347/6 |
| RE32,294 | E | * | 11/1986 | Knute | 604/253 |
| 4,668,216 | A | * | 5/1987 | Martin et al. | 604/253 |
| 4,680,977 | A | * | 7/1987 | Conero et al. | 73/861.41 |
| 4,820,268 | A | * | 4/1989 | Kawamura et al. | 604/67 |
| 5,045,069 | A | * | 9/1991 | Imparato | 604/253 |
| 5,278,626 | A | * | 1/1994 | Poole et al. | 356/36 |
| 5,331,309 | A | * | 7/1994 | Sakai | 340/606 |
| 5,439,442 | A | * | 8/1995 | Bellifemine | 604/65 |
| 5,588,963 | A | * | 12/1996 | Roelofs | 604/65 |
| 5,601,980 | A | * | 2/1997 | Gordon et al. | 435/6.13 |
| 5,707,588 | A | * | 1/1998 | Tsukishima | 422/500 |
| 5,800,386 | A | * | 9/1998 | Bellifemine | 604/65 |
| 6,015,083 | A | * | 1/2000 | Hayes et al. | 228/254 |
| 6,083,206 | A | * | 7/2000 | Molko | 604/253 |
| 6,159,186 | A | * | 12/2000 | Wickham et al. | 604/251 |

(Continued)

FOREIGN PATENT DOCUMENTS

| CN | 201110955 | 9/2008 |
|---|---|---|
| CN | 201379841 | 1/2010 |

(Continued)

OTHER PUBLICATIONS

Dillencourt et al. "A General Approach to Connect-Component Labeling for Arbitrary Image Representations" (Apr. 1992) J. of the Asso. for Computing Machinery, vol. 39, No. 2, p. 253-280.*

(Continued)

*Primary Examiner* — Sath V Perungavoor
*Assistant Examiner* — Matthew J Anderson

(57) ABSTRACT

We describe a method and apparatus for monitoring the dripping speed in IV process, as well as detecting the its end. The apparatus includes a camera and a processing unit to analyze the information from the acquired video. Features from the image sequence are extracted and the dripping speed is computed accordingly by discrete Fourier transform. The apparatus is also capable of detecting the end of the dripping process by finding the location of liquid surface in the drip chamber. We also describe the use of barcode to provide information to the monitoring device and program.

17 Claims, 24 Drawing Sheets

(56) References Cited

U.S. PATENT DOCUMENTS

| | | | |
|---|---|---|---|
| 6,213,354 B1* | 4/2001 | Kay | 222/420 |
| 6,599,282 B2* | 7/2003 | Burko | 604/507 |
| 6,736,801 B1* | 5/2004 | Gallagher | 604/253 |
| 7,068,831 B2* | 6/2006 | Florent et al. | 382/132 |
| 7,070,121 B2* | 7/2006 | Schramm et al. | 239/102.1 |
| 7,163,740 B2* | 1/2007 | Rosati et al. | 428/343 |
| 7,448,706 B2* | 11/2008 | Yamanobe | 347/5 |
| 7,499,581 B2* | 3/2009 | Tribble et al. | 382/141 |
| 7,677,689 B2* | 3/2010 | Kim et al. | 347/19 |
| 7,776,927 B2* | 8/2010 | Chu et al. | 516/54 |
| 7,783,107 B2* | 8/2010 | Zandifar | 382/173 |
| 7,918,834 B2* | 4/2011 | Mernoe et al. | 604/253 |
| 7,952,698 B2* | 5/2011 | Friedrich et al. | 356/138 |
| 8,184,848 B2* | 5/2012 | Wu et al. | 382/100 |
| 8,257,779 B2* | 9/2012 | Abernathy et al. | 427/8 |
| 8,282,894 B2* | 10/2012 | Lee et al. | 422/500 |
| 2006/0096660 A1* | 5/2006 | Diaz et al. | 141/325 |
| 2006/0146077 A1* | 7/2006 | Song et al. | 347/2 |
| 2006/0254982 A1 | 11/2006 | Kopperschmidt | |
| 2007/0293817 A1* | 12/2007 | Feng et al. | 604/65 |
| 2008/0147016 A1* | 6/2008 | Faries et al. | 604/253 |
| 2009/0180106 A1* | 7/2009 | Friedrich et al. | 356/138 |
| 2010/0021933 A1* | 1/2010 | Okano et al. | 435/7.1 |
| 2010/0120601 A1* | 5/2010 | Hayamizu et al. | 501/11 |
| 2011/0142283 A1* | 6/2011 | Huang et al. | 382/103 |
| 2011/0144595 A1* | 6/2011 | Cheng | 604/253 |
| 2011/0178476 A1* | 7/2011 | Lin | 604/253 |
| 2011/0190146 A1* | 8/2011 | Boehm et al. | 506/7 |
| 2011/0206247 A1* | 8/2011 | Dachille et al. | 382/128 |
| 2011/0275063 A1* | 11/2011 | Weitz et al. | 435/6.1 |
| 2011/0316919 A1* | 12/2011 | Baldy et al. | 347/14 |
| 2011/0317004 A1* | 12/2011 | Tao | 348/135 |

FOREIGN PATENT DOCUMENTS

| | | | |
|---|---|---|---|
| DE | 2631951 A | * | 1/1978 |
| EP | 529569 A2 | * | 3/1993 |
| GB | 2309801 | | 8/1997 |
| JP | 2007229928 A | * | 9/2007 |
| JP | 2009298012 A | * | 12/2009 |
| KR | 2010037914 A | * | 4/2010 |

OTHER PUBLICATIONS

Nixon, Mark S. and Aguado, Alberto S. "Feature Extraction and Image Processing" 1st ed. Woburn, Ma: Newnes Publishing, 2002.*
Rafael C. Gonzalez & Richard E Woods, Digital Signal Processing 2nd edition, Prentice House 2002, ISBN 0201180758.

* cited by examiner

Figure 1:
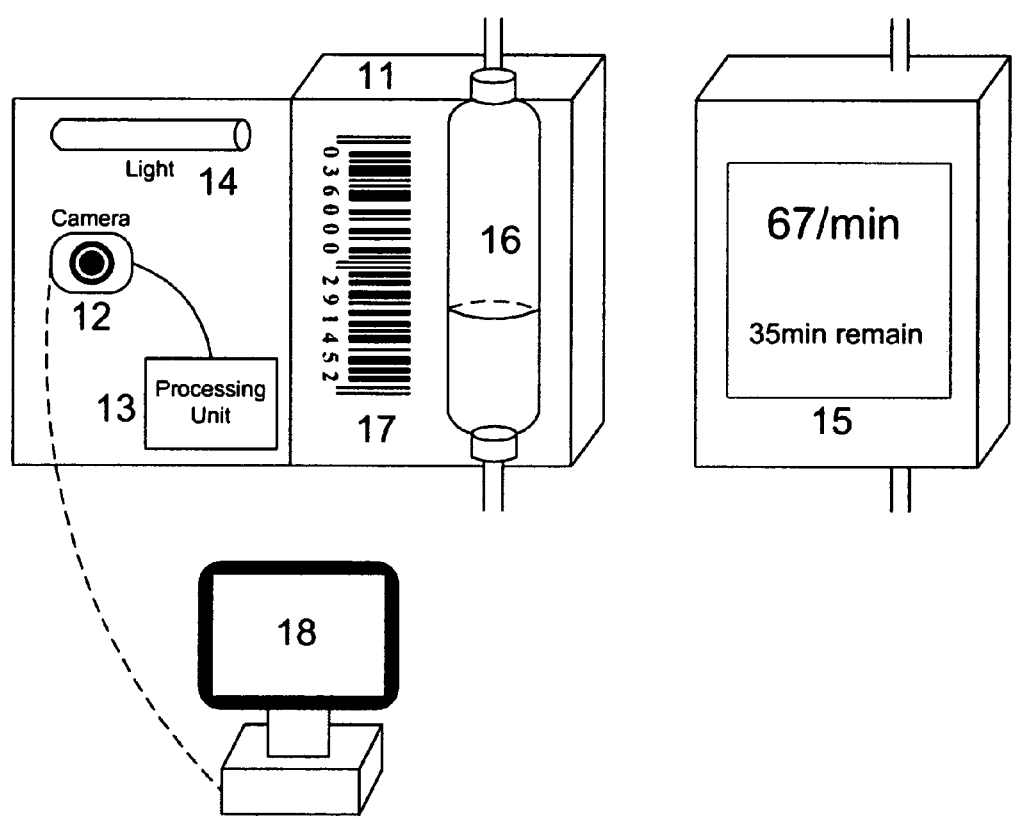

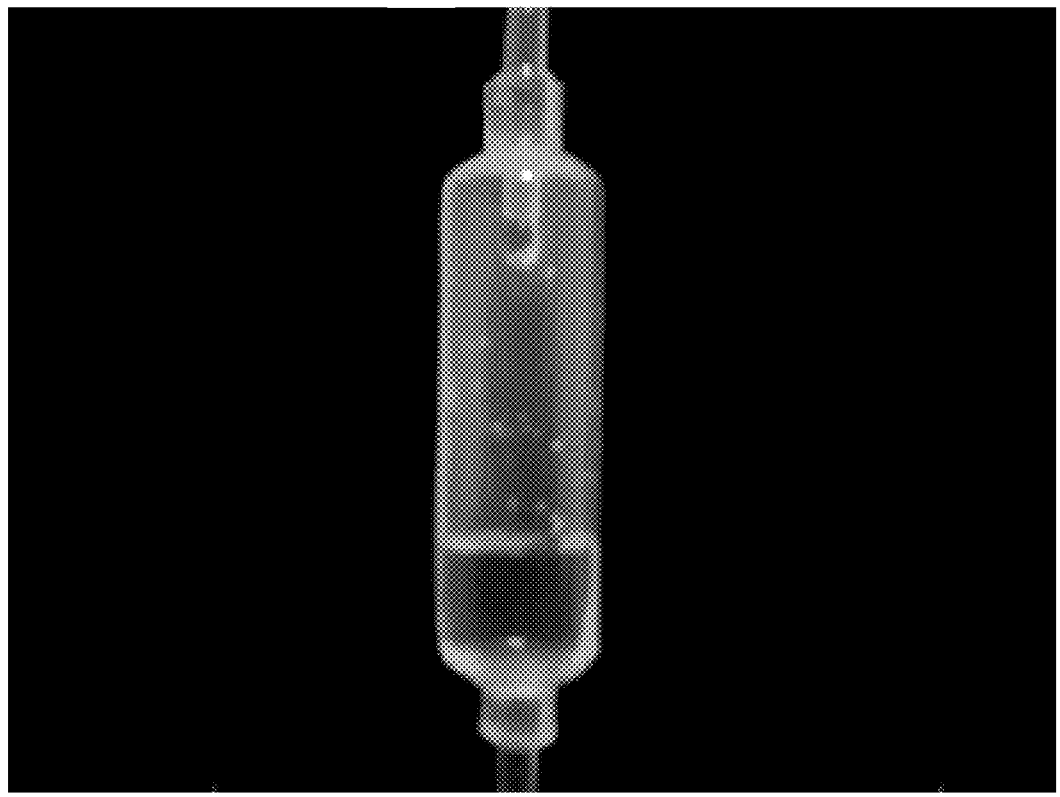
Figure 2A-1: This is the enlarged left part of the original Figure 2A.

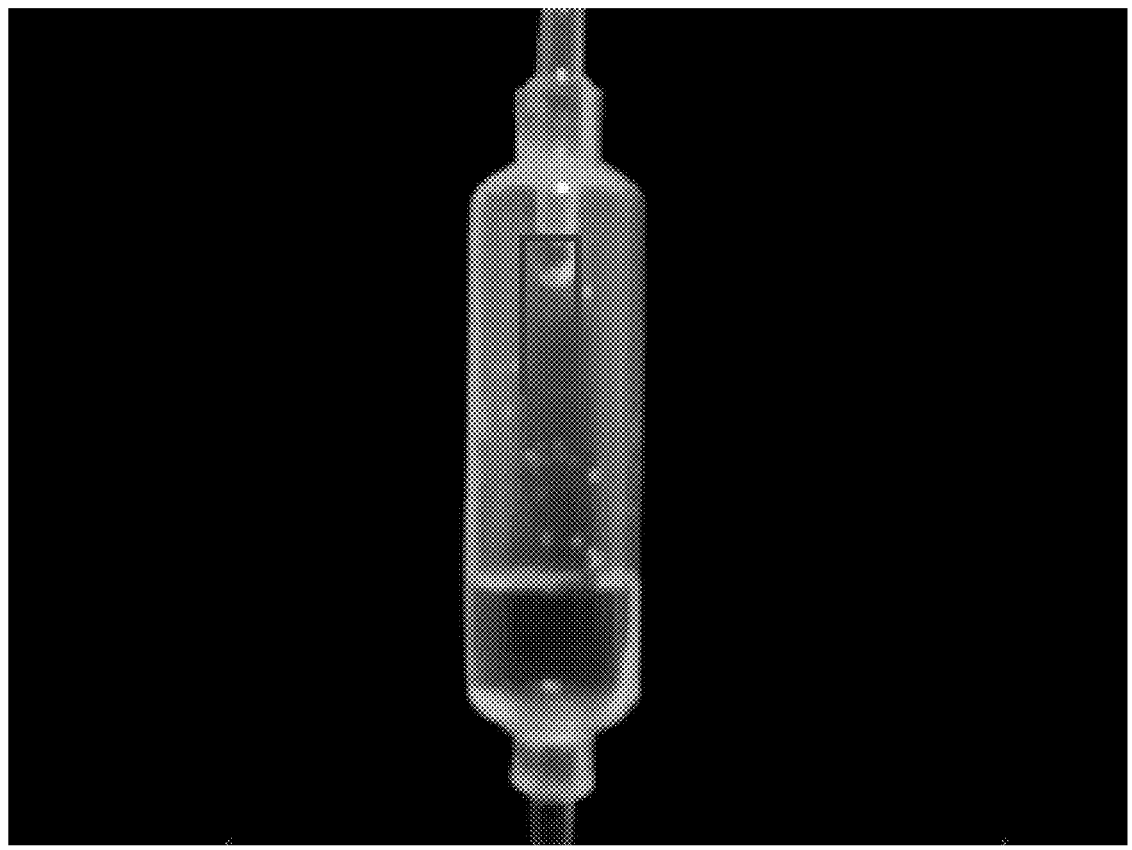
Figure 2A-2: This is the enlarged right part of the original Figure 2A.

$$\begin{bmatrix} -1 & -2 & -1 \\ 0 & 0 & 0 \\ 1 & 2 & 1 \end{bmatrix}$$

Fig 2B $$\begin{bmatrix} -1 & -1 & -1 \\ 0 & 0 & 0 \\ 1 & 1 & 1 \end{bmatrix}$$

Fig 2C $$\begin{bmatrix} 0 & -1 & 0 \\ -1 & 4 & -1 \\ 0 & -1 & 0 \end{bmatrix}$$

Fig 2D

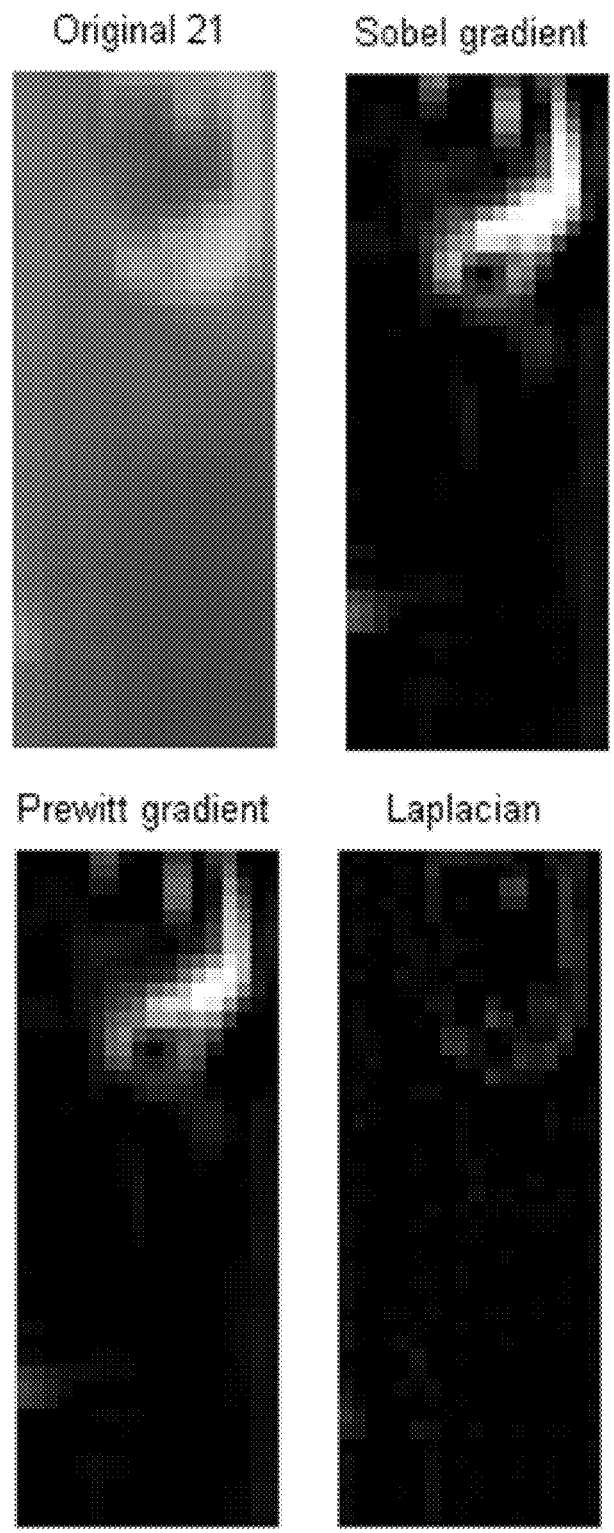
Figure 2E: This is the enlarged original image, but has been rearranged in two rows since the original one row arrangement only allows a small enlargement ratio.

Original 30 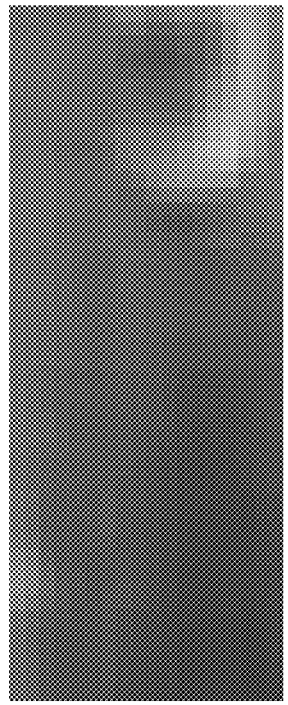 Sobel gradient 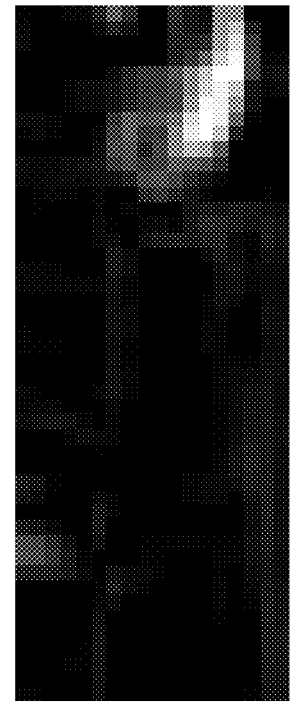
Thresholded, Otsu 1; 11 ,6.727 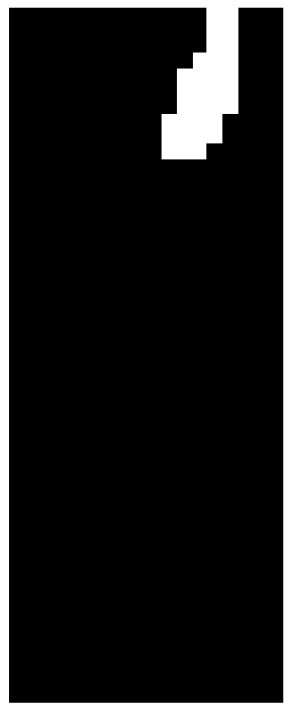 
Figure 3A: This is the enlarged image of the original Figure 3A.

Original 33 | Sobel gradient
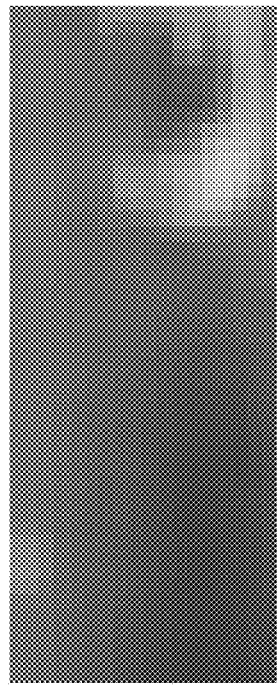 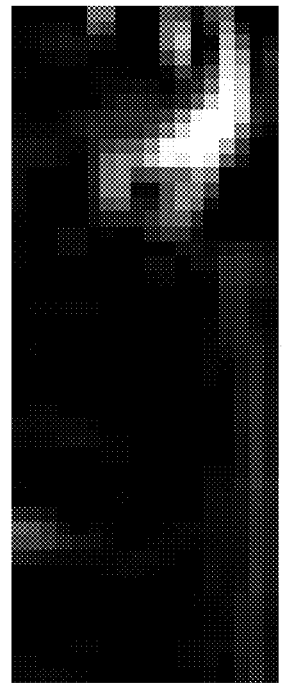
Thresholded, Otsu 1; 17 ,9.529
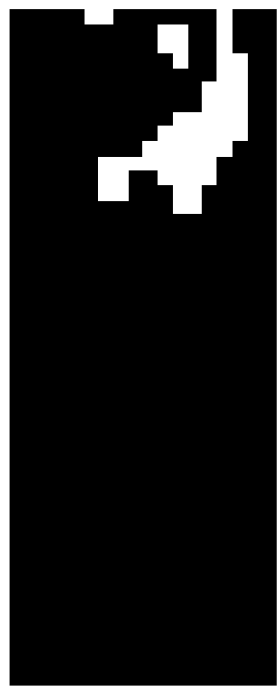 
Figure 3B: This is the enlarged image of the original Figure 3B.

Original 37　　Sobel gradient
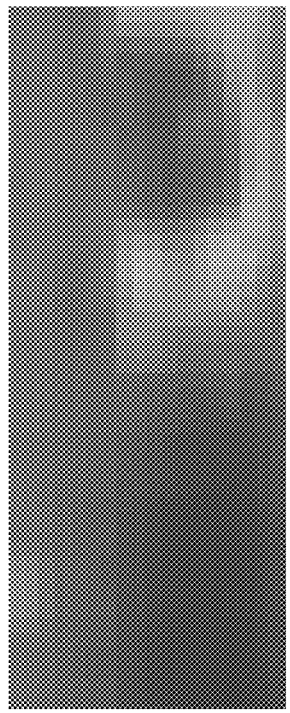 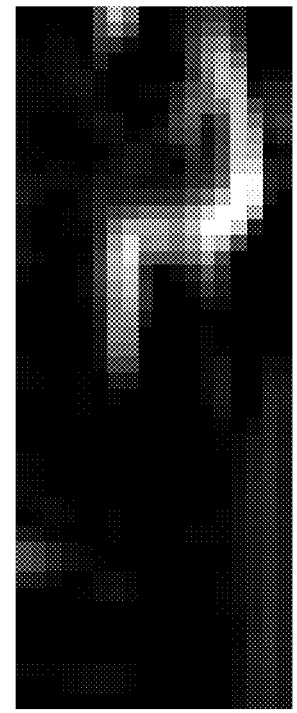
Thresholded, Otsu  2;  17 ,14.76
 
Figure 3C: This is the enlarged image of the original Figure 3C.

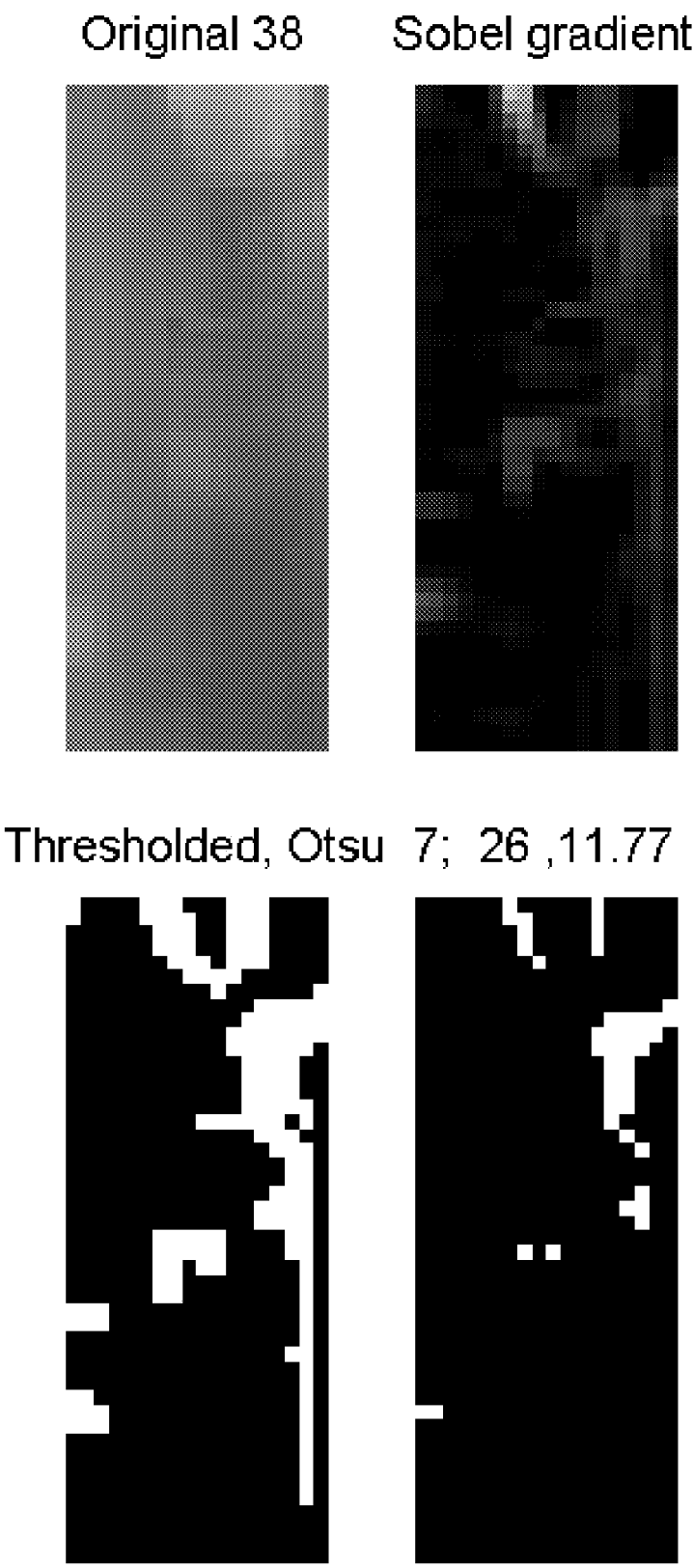
Figure 3D: This is the enlarged image of the original Figure 3D.

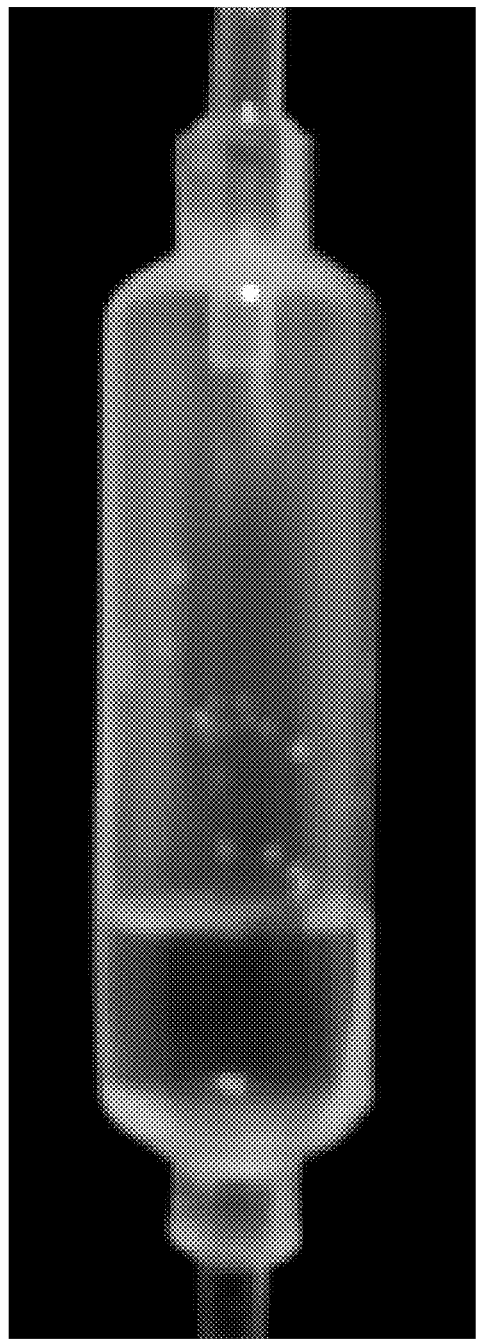
Figure 5A: This is the enlarged image of the original Figure 5A.

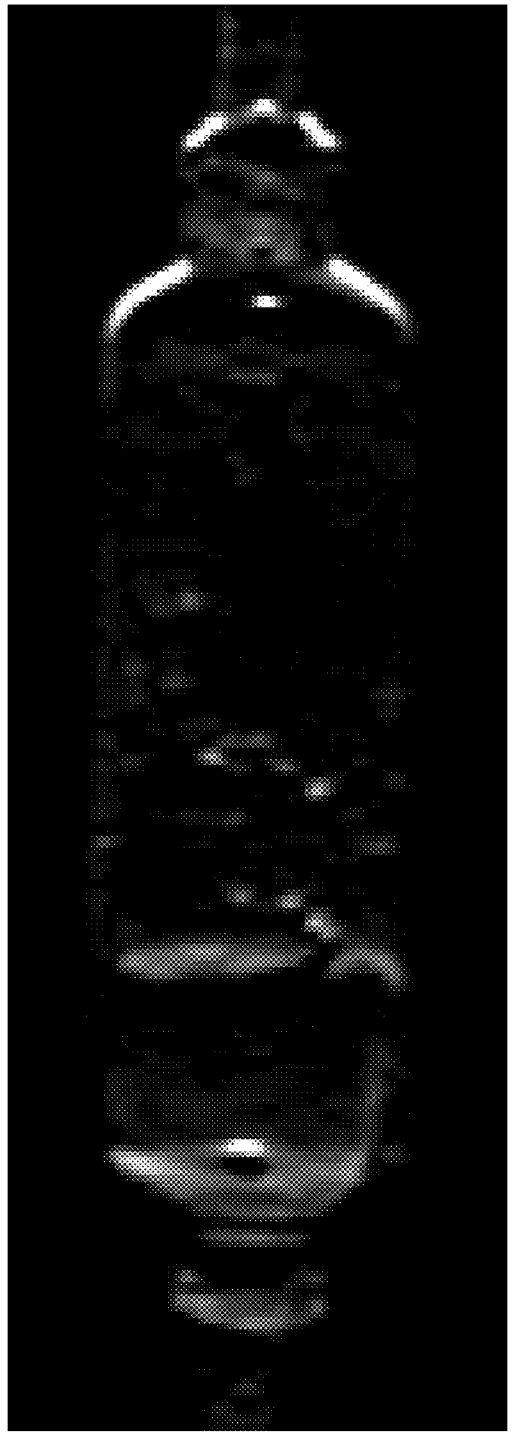
Figure 5B: This is the enlarged image of the original Figure 5B.

Figure 5C: This is the enlarged image of the original Figure 5C.

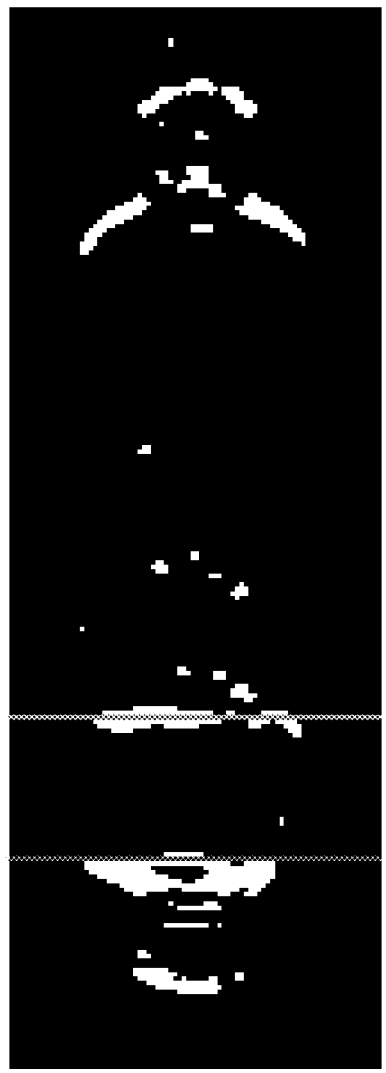
Figure 5F: This is the enlarged image of the original Figure 5F.

```
0 0 0 1 1 0 1
0 1 1 1 1 0 1
0 1 0 1 1 1 1
0 0 0 1 1 0 1
0 0 0 1 1 0 1
0 0 0 1 1 0 1

1 1 0 1 1 0 0
1 1 1 0 1 0 0
1 1 0 0 1 1 0
1 0 1 1 1 0 0
1 0 0 1 1 1 0
1 1 0 1 1 0 0
```

Figures 6A, 6B:
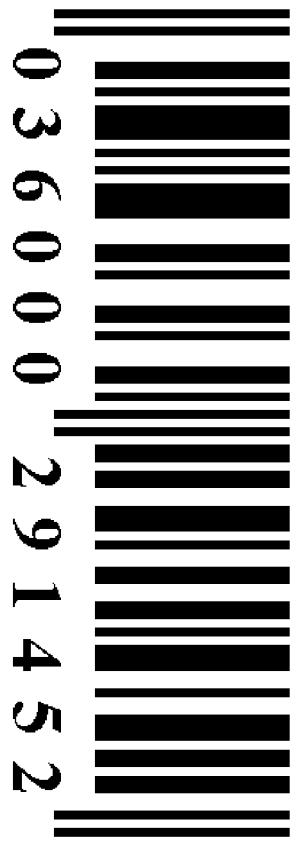

The String "Fig 6A" is rotated here.

IV MONITORING BY VIDEO AND IMAGE PROCESSING

CROSS-REFERENCE TO RELATED APPLICATIONS

Application Ser. No. 12/825,368: IV Monitoring by Digital Image Processing, by the same inventor

FEDERALLY SPONSORED RESEARCH

Not Applicable

THE NAMES OF THE PARTIES TO A JOINT RESEARCH AGREEMENT

Not Applicable

SEQUENCE LISTING OR PROGRAM

Not Applicable

BACKGROUND

1. Field of Intention
This invention relates to
1. IV dripping monitoring
2. Use of barcode in IV monitoring
2. Prior Art
IV dripping usually takes a long time. Attempts have been made to automatically monitor the process and there are some existing systems. Most of them use physical approaches.

One category of methods is to count the drops, and these are typically done by using optical sensors. There are several US patents falls in this category, for example:
1. U.S. Pat. No. 4,383,252 Intravenous Drip Feed Monitor, which uses combination of a diode and phototransistor to detect drips.
2. U.S. Pat. No. 6,736,801 Method and Apparatus for Monitoring Intravenous Drips, which uses infrared or other types of emitter and a sensor combined to count the drips.

Apparatus that counts number of drops can serve chiefly two purposes:
1. Alarm when the dripping speed deviates too much from a predetermined value
2. Alarm when dripping has stopped to prevent infiltration Our invention addresses these problems from a different perspective. We use camera to record the dripping process and analyze its speed from the video. We also detect the surface of liquid in the drip chamber and alarm the patient when it begins to fall.

SUMMARY

Our invention has two purposes: monitoring the dripping speed and alarming when the process finishes. Both functions can be performed by the same device, but uses different algorithms. In our following illustrational embodiment, the device is made up chiefly of a containing box, a camera and a processing unit. The drip chamber is placed at a fixed location inside the box so that its relative position to the camera is also fixed.

For dripping speed monitoring we analyze a sequence of images. In each image, the same measurement is being computed, and requirement on this measurement is that it must display the same periodicity as the dripping itself. Such measurements from a sequence of images form a signal. To determine the dripping speed, discrete Fourier transform is performed and its largest non-constant component is recognized as the number of periods in the image sequence. Speed can then be computed accordingly.

Several possible measurements are shown in the discussion including size of the drip, location of the drip as well as the average gray level in a certain area of the image. Experiments show that our method provides accurate speed measurement for a wide range of actual speeds.

In the description of FIG. 3 we give a mathematical justification and a criterion on the choice of measurement. It established the theoretical basis that any measurement capturing the periodicity in the dripping could be used to determine the speed. Our results also proved this experimentally.

For detecting the end of the dripping process we find the location of the liquid surface in the drip chamber. However, since the dripping causes agitation in the liquid surface, we compute first the average of several consecutive images to eliminate the effect of this agitation. We then perform edge detection and identify the longest horizontal line segment inside the chamber as the liquid surface. When this surface begins to fall, the device will alarm the patient and nurses.

The use of barcode is introduced for providing information to the algorithm. Knowing the type and measurements of the drip chamber can help the program to focus on the right area of the image which is required by the algorithm. The barcode can be read by the camera and information can be extracted therefrom. Based on other information contained in the barcode such as the volume of the drug, estimation of the remaining time can also be achieved.

The advantages of this invention are 1) accuracy 2) economy 3) convenience. It achieves high accuracy with low-cost camera, ensures safety and saves countless time for patients and nurses.

DRAWINGS—FIGURES

FIG. 1 shows one possible, embodiment of the hardware
FIG. 2A-2E shows captured image of the drip chamber and preprocessing of the image.
1. FIG. 2A shows on its left one image that is captured, and on its right the area enclosed in a rectangle where the analysis is performed on.
2. FIG. 2B shows a vertical Sobel gradient operator.
3. FIG. 2C shows a vertical Prewitt gradient operator.
4. FIG. 2D shows a Laplacian operator.
5. FIG. 2E shows the part contained in the rectangle of FIG. 2A and its Sobel, Prewitt and Laplacian results, respectively.

FIG. 3A-3D shows analysis steps performed on a sequence of captured images. Each figure contains on its top left the original image, top right the result of Sobel gradient operator, bottom left thresholding result of the Sobel gradient, bottom right erosion result of the bottom left.

Numbers in image titles:
1. The number in the title of the top left image is its index in the image sequence.
2. Numbers in the title of the bottom right image contains three parts:
   a. The first number before the semicolon is the number of connected components in the image.
   b. The second number immediately following the semicolon is the size of the largest connected component in pixels.
   c. The last number is the vertical coordinate of the centroid of the largest component.

FIG. 3E shows the erosion kernel used in the bottom right image of FIG. 3A-3D.

FIG. 4 shows the determining of dripping speed by Discrete Fourier Transform from a sequence of measurements.
1. FIG. 4A shows vertical coordinates of the centroid as in FIG. 3A-3D over a sequence of images.
2. FIG. 4B shows the discrete Fourier transform of FIG. 4A.
3. FIG. 4C shows size of the largest connected component as in FIG. 3A-3D over a sequence of images.
4. FIG. 4D shows the discrete Fourier transform of FIG. 4C.
5. FIG. 4E-4F repeat FIG. 4A-4B for another sequence of images.
6. FIG. 4G-4H repeat FIG. 4A-4B for another sequence of images.
7. FIG. 4I shows the change of image's average gray level over time for the same image sequence as in FIG. 4A
8. FIG. 4J shows a magnified display of the discrete Fourier transform of FIG. 4I.

Figure 5D:
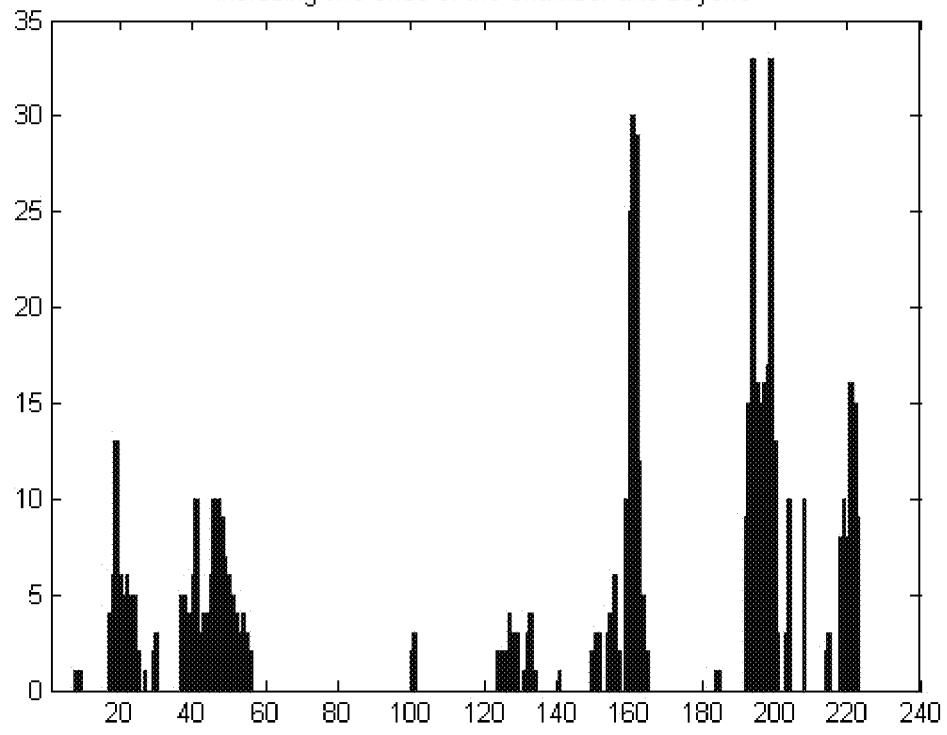
Figure 5E:
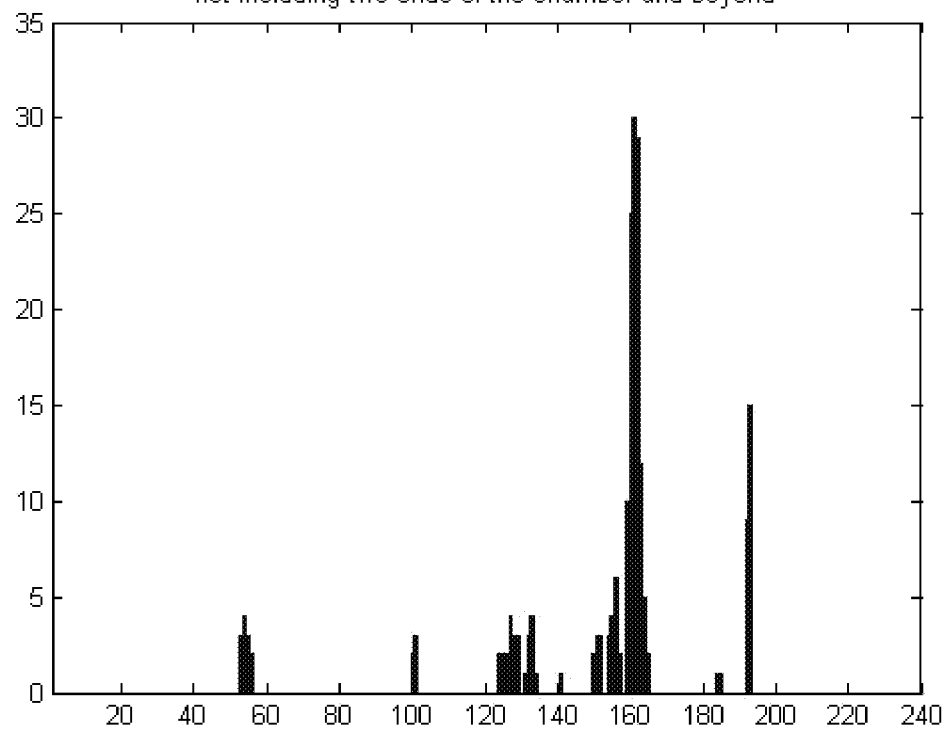

FIG. 5A-5F shows how to detect the liquid surface in the drip chamber.
1. FIG. 5A shows the average image of 10 consecutive images from the video.
2. FIG. 5B shows the result of applying vertical Sobel gradient operator (FIG. 2B) to FIG. 5A.
3. FIG. 5C shows thresholding result on FIG. 5B.
4. FIG. 5D shows the maximum number of consecutive points in each line in FIG. 5C.
5. FIG. 5E shows the maximum number of consecutive points in each line in FIG. 5C, but only for lines that are between and not including the two ends of the chamber.
6. FIG. 5F shows the liquid surface and chamber bottom being detected and marked.

FIG. 6A-6B shows how barcode can be used to provide information to the monitor.
1. FIG. 6A shows an example of a typical barcode.
2. FIG. 6B shows the scanning result of FIG. 6A.

Figure 7A:
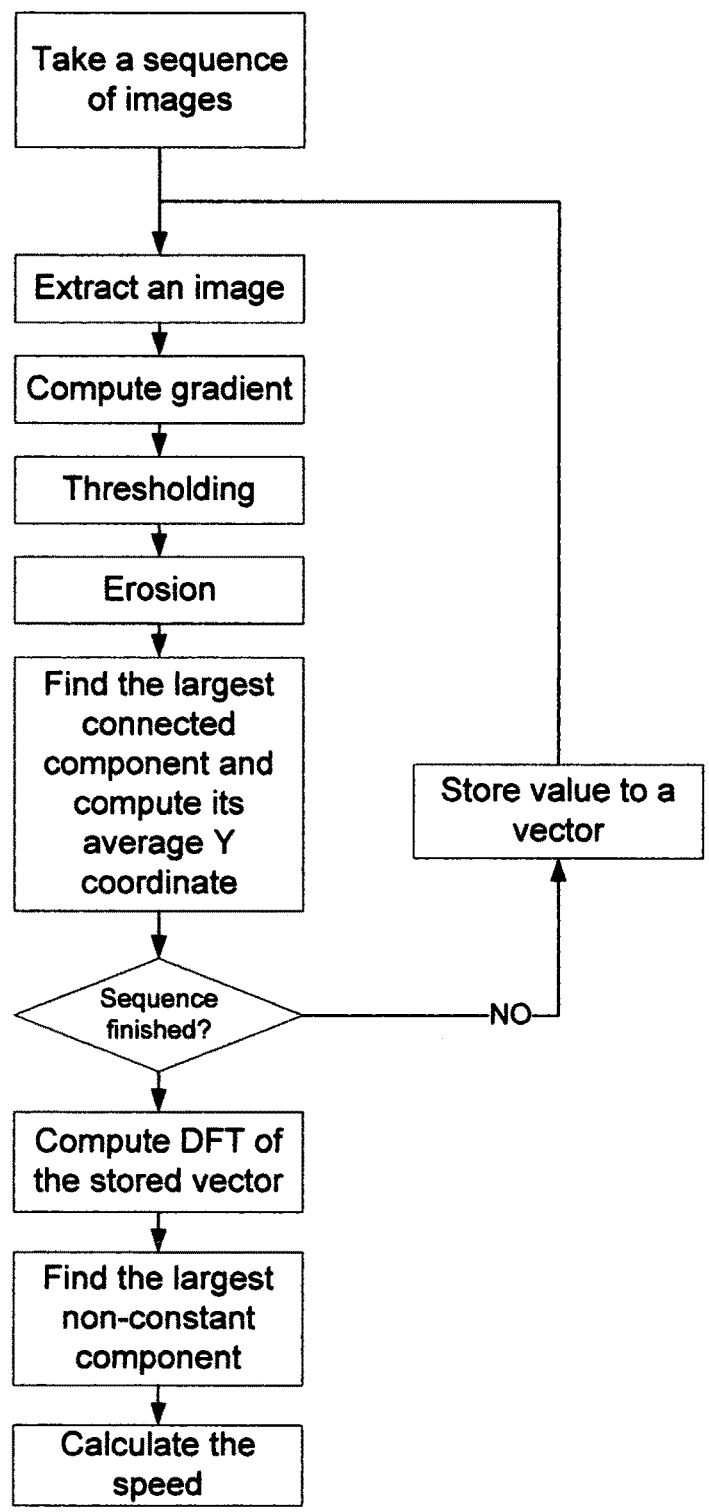
Figure 7B:
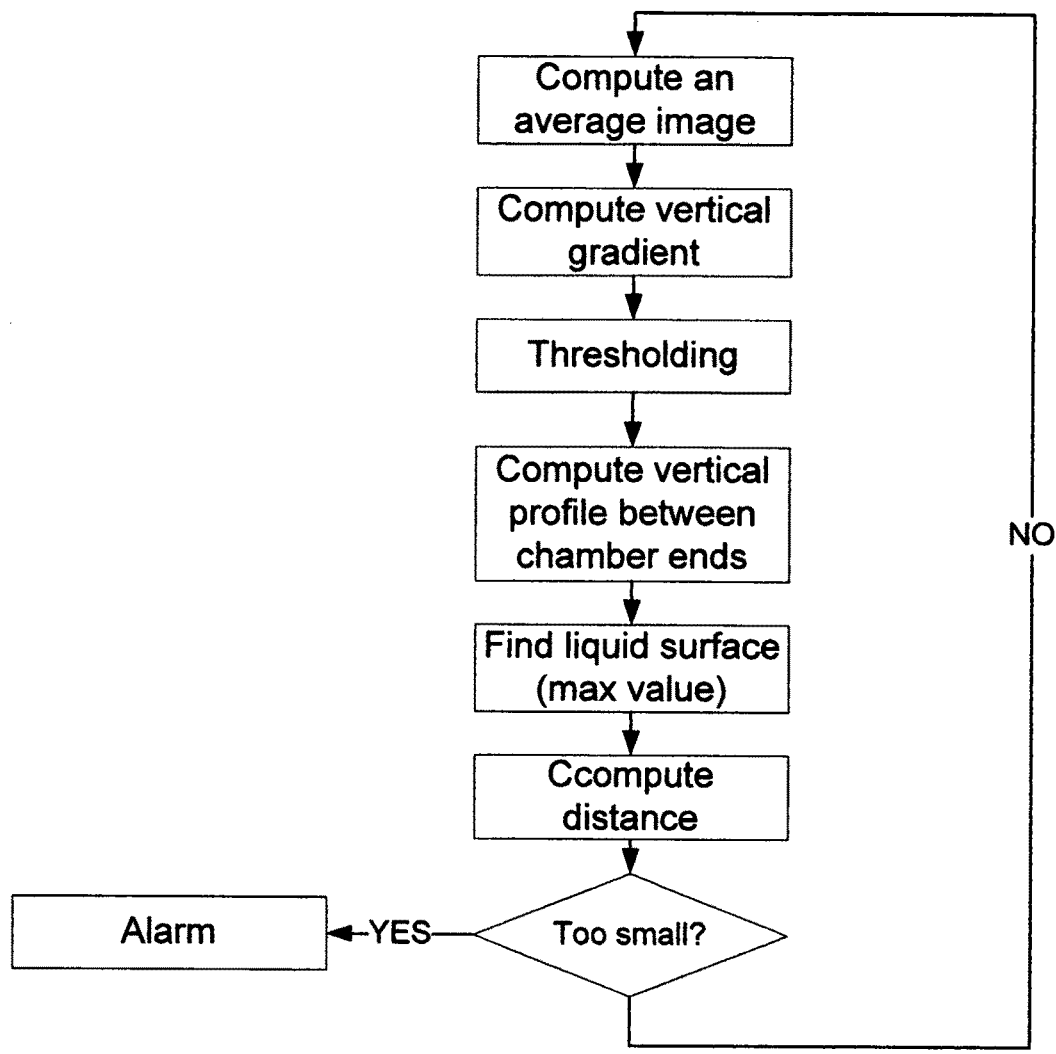
Figure 7C:
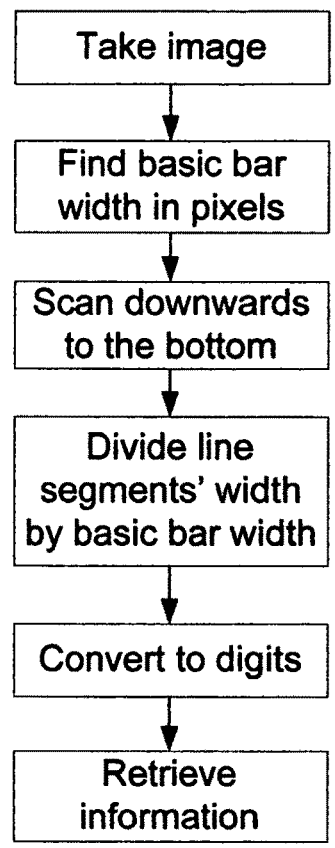

FIG. 7 shows flow charts of several algorithms
1. FIG. 7A shows the algorithm for an embodiment of speed monitoring.
2. FIG. 7B shows the algorithm for an embodiment the alarming functionality.
3. FIG. 7C shows the algorithm for an embodiment of barcode reading.

DRAWINGS—REFERENCE NUMERALS

11 Containing box
12 Camera
13 Processing unit
14 Light source
15 Display on the outside of the containing box
16 Drip chamber
17 Barcode label affixed on the wall inside the containing box

DETAILED DESCRIPTION

Introduction

The first purpose of this invention is to ensure safety. In medical practice, there is usually requirement on the speed of N dripping. Newborns, adults, people with cardiovascular or nephropathic conditions all require different speeds. If the speed deviates too much from the prescribed value, there can be harmful effects. In the extreme cases, this can even be life-threatening.

The second purpose of this invention is to ensure efficacy. Many drugs have requirements on administration rate. If the speed is too slow or too fast, the intended effect cannot be achieved.

The third purpose of this invention is to save labor and time of nurses and patients. During the normal dripping process, both nurses and patients need to frequently check the speed and adjust it when deviation occurs and this practice occupies a large amount of their time and attention. It is also hard to estimate the remaining time for the dripping process to finish, making scheduling for nurses and patients themselves a difficult task.

There are, of course solutions to all these problems, such as by using an infusion pump. However, the high price of infusion pumps (nowadays usually over $1,000) makes them prohibitive for use in ordinary treatment, especially in developing countries. There are also devices to measure the dripping speed using infrared signals. The inventor has no access to this type of infrared-sensor-based devices, thus cannot comment on its effect.

In this invention we provide an accurate, yet low-cost alternative by using video and image processing techniques to measure the dripping speed. Our invention gives very accurate measure of the dripping speed for a wide speed range of speeds which are suffice for ordinary practice, and is economically attractive in that it requires only a low-resolution and low-frame-rate camera plus a low-cost processing unit. In addition, it is also capable of detecting the height of the liquid surface inside the drip chamber, thus being able to alarm the nurse and patient when the drug has depleted and the surface begins to fall, preventing the flow of blood back into the tube due to failure in noticing that.

The details of the invention are illustrated in the following description.

FIG. 1—One Possible Embodiment of the Hardware 11 is a containing box which is made of non-transparent material so that no outside light could come in, ensuring an ideal, constant shooting environment for the camera.

12 is a camera which is fixed on the door of the box. It will face the drip chamber when the door closes.

13 is an independent processing unit which is capable of process the captured video by itself.

14 is the light source inside the box to provide ideal illumination for the camera.

15 is the outside of the door of the containing box. It shows current dripping speed and time information on a low power-consumption display such as an LCD.

16 is a drip chamber being fixed at two ends inside the box.

17 is a barcode label which will be read by the camera to provide information about the dripping process.

18 is a remote monitoring station which can perform the task of 13 for a large number of monitoring cameras.

FIG. 2—Preprocessing

We demonstrate an example using a camera whose resolution is 320×240 and frame rate is 15 fps (frame per second). As a component for other digital devices, cameras of this specification costs only bucks of dollar from manufacturers in China. One image extracted from the acquired video is shown in FIG. 2A with the chamber located in the center. The right of FIG. 2A uses a rectangle to designate the area where the actual analysis is performed on.

Why would we need to specify this area in the image? We notice that: 1) this area extends from the end of the mouth that the drips come out to the middle of the chamber 2) the liquid surface is not included.

The reason of choosing this area is to achieve the required accuracy with the lowest budget.

If cost is not a consideration, one can of course afford high-end cameras with much finer resolution and higher frame rate. In this extreme, the motion of the drip can be captured in the same way as trajectory of falling physical objects being captured by high speed camera in laboratory experiments. Coupled with powerful chips, measurements can be made on various aspects of the dripping including the speed. But if such a cost is required then commercially there is no competitiveness comparing with infusion pumps, and it is most likely that the invention would not sell.

With the ambition on the low price, it is impractical to analyze the full trajectory of drip's falling process. The longest length of the chamber is usually less than 5 cm (2 inches) and the surface height in the chamber usually exceeds 1 cm (0.4 inch). Therefore, the remaining height for the drip to fall from the mouth where it comes out to the liquid surface is usually less than 4 cm (1.6 inch). Assuming no air friction, the time needed for the drip to reach the liquid surface is about $\sqrt{2h/g}=\sqrt{2\times 4\times 10^{-2}/9.8}=0.0903$ sec. The frame rate of the camera is 15 which means that images are captured at intervals of 1/15=0.067 seconds. Although this interval is still smaller than the time needed for the drip to fall to the liquid surface, capturing one or two blurred images (due to the speed of falling) of the trajectory doesn't help much to the analysis. If we focus on the much slower process of the forming of the drip at the tube's mouth, which grows from a smaller size to larger, and eventually falls off, there is already sufficient information that we can exploit to determine its periodicity (speed). In fact, this is exactly the approach this embodiment uses.

Another question is why not focusing on the liquid surface? The falling drip will agitate the liquid and there will be rise and fall of its surface, which can also be used determine the dripping speed. This rise and fall is faster than the forming of the drip at the mouth of the tube, but is usually slower than the falling process. This approach is possible and should not be opted out, and the fundamental principle for determining the periodicity is the same as the method used in our illustrational embodiment.

We discuss in the above reasons for choosing a small window in the image for analysis. It is mainly because the forming of the drips relatively is the slowest comparing with its falling and the agitation of liquid it caused, so we choose this for its computational merit and low requirement on the camera. As the description later will show, the determining of the speed is done by performing discrete Fourier transform on the extracted signal. No matter the signal is extracted from which part of the image, this fundamental underpinning remains unchanged. Therefore, the choice on the part of the image where the analysis is performed on should only be interpreted as an instructive illustration rather than a limitation.

There still remains a problem: how to determine the position of the window within the image? In this illustrational example the position and size of the rectangle is manually chosen, but how about in the real product? Of course, the device can perform object recognition, analyzing various part of the chamber and choosing the window automatically, which is one feasible. Since the contents of the acquired image are simple and the chamber can be fixed at a certain location inside the containing box, this recognition would not be difficult. However, even if recognition for this type of drip chamber can be done accurately, what about other types of drip chambers? That the recognition works well for one type doesn't guarantee the same for another. More importantly, in medical application error is usually not tolerated.

Our solution is to use barcode to solve this problem. Referring to 17 in FIG. 1, the camera can read the barcode and various aspects of the dripping process therefrom, including the type of the drip chamber. Different windows will be chosen for different drip chambers and the device will work accordingly.

Next we show how to enhance the acquired image.

The first image of FIG. 2E is the content in the windows of FIG. 2A. It is a grayscale image, and with the knowledge of its location we can recognize that the brighter object on top is the lower part of a forming drip that is reflecting light. To make it more amenable to computation we use digital image processing technique to enhance the image. FIG. 2B shows a vertical Sobel gradient operator, FIG. 2C a vertical Prewitt operator, FIG. 2D a Laplacian operator. For details on these operators please refer to Chapter 3 and section 10.13 of [Digital Image Processing, 2ed, Prentice Hall, 2002, Gonzalez, Woods].

The second, third and fourth image in FIG. 2E are the results after applying Sobel, Prewitt and Laplacian operators. In FIGS. 2B and 2C we show only the vertical version of Sobel and Prewitt operators, but the results in FIG. 2E are the "full" gradient result. More precisely, we compute an approximation of the absolute value of the gradient by adding the absolute value of its vertical and horizontal components:

$$|\text{Gradient}|=|G_x|+|G_y|$$

This is standard approach in the field of digital image processing. Please refer to page 579 of [Digital Image Processing, 2ed, Prentice Hall, 2002, Gonzalez, Woods] for its details.

From FIG. 2E, we see that the Sobel gradient result is the strongest and is brighter than the result of Prewitt gradient. The Laplacian yields the weakest response. Both Prewitt and Laplacian results as well as numerous other enhancement techniques, including filtering in the frequency domain, have their utilities, but the purpose is all to highlight the significant features in the image. Therefore, although we will use Sobel gradient result in the following description, the choice of image enhancing technique should be interpreted only as an illustration rather than any limitation.

FIG. 3—Extracting Feature from the Image

We show how numerical features can be extracted from video (image sequences). FIG. 3A contains four images and the top two are an original image on the left and its Sobel gradient result on the right. In the title of the original image there is a number which is its index in the image sequence. Therefore, "original 30" means the 30th frame in the sequence. The bottom left is the thresholding result on the Sobel gradient image, and the "Otsu" in its title indicates that the threshold value is automatically selected by using Otsu's method, thus eliminating the need for human intervention. The purpose of thresholding is to convert the gray level Sobel gradient image to a binary image. The bottom right is the erosion result of the binary image.

Why would we need to perform erosion? The purpose is to eliminate unnecessary small points. Looking at FIG. 3B-3D, thresholding results contain several connected components and most of the smallest components are unnecessary, especially for FIG. 3D. The rationale is that the brighter reflection on the drip is the largest of the brighter components in the image and the smaller components are consequently not of our interest. Therefore, we simply use erosion as a tool to remove the smallest parts. The kernel of the erosion is shown in FIG. 3E. Of course, for cameras of higher resolution we, need to choose a larger kernel.

Erosion is an elemental morphological operation in digital image processing. Please refer to chapter 9 of [Digital Image Processing, 2ed, Prentice Hall, 2002, Gonzalez, Woods] for its detail.

The title of the eroded image contains three parts. The first is the number of connected components in the image. We choose 8-connectivity in this embodiment, but the actual implementation can choose freely 8, 4, or m-connectivity. For what is 8, 4, or m-connectivity please refer to section 2.5 of [Digital Image Processing, 2ed, Prentice Hall, 2002, Gonzalez, Woods]. The second part of the title is the size of the largest connected component in number of pixels. The third part is the vertical coordinate of the centroid of the largest component, which is simply the average of its Y coordinates. For example, the title of the bottom right image of FIG. 3D is "7; 26, 11.77" which means the image contains 7 connected components, the size of the largest one in number of pixels is 26 and its average vertical coordinate is 11.77.

Images in FIG. 3A-3D are the 30th, 33th, 37th and 38th images in the sequence and the reason we are not showing consecutive images here is to save space in this description. Comparing the 33th and the 30th image, we see that the size of the drip is growing larger and its position is becoming lower. This is also evident in the gradient, thresholding and erosion result. The size of the largest component grows from 11 pixels to 17 pixels and its average Y coordinate grows from 6.727 to 9.529, consistent with the fact that the drip is becoming larger and getting lower.

In FIG. 3C which is the 37th image in the sequence the drip has already started falling. Gravity has pulled it longer and this is evident also in the gradient, thresholding and erosion result. Comparing with FIG. 3B, its average Y coordinate of the largest component has grown from 9.529 to 14.76, but the size remains unchanged.

FIG. 3D is the 38th image in the sequence and its content is not as visible as in previous figures. There is a relatively brighter spot in the middle of the image, but it is hard to interpret whether it is the head or tail of the falling drip or merely due to reflections on the surface of the chamber. There is also a new drip on the top that is forming. The gradient, threshold and erosion results are also hard to interpret. The thresholding results contains several parts of significant size and still many after erosion, and the results seem not to be consistent with our visual impression of the original image.

Does this fact invalidate our algorithm? This is a very important question to answer before we can justify the validity of our approach. The affirming answer can be given mathematically: since the dripping is a periodical process, the captured image sequence is periodic. The algorithm is a fixed, mechanical process which yields same result for same input. Therefore, the output of this mechanical process for a periodic signal is also periodic. Expressing this fact in symbols:

Image($t+T$)=Image($t$)

Therefore $F$(Image($t+T$))=$F$(Image($t$))

Because of this, even if there are "noise" in the extracted signal as in FIG. 3D, we can still guarantee that the information gathered over time is a periodic signal. Since its period is the same as the dripping process, the dripping speed can be computed therefrom using discrete Fourier transform.

Moreover, as we have discussed in the description for FIG. 2, the forming of the drip is much slower than the falling of it, therefore for most of the images in the sequence we can extract meaningful result using our analysis algorithm and the period of the extracted signal is not changed by a small fraction of abnormal results.

The above mathematical discussion on periodicity is of fundamental importance. Basically, it points out that any measure of the image, as long as it can faithfully capture the periodicity of the dripping process, can be used to compute its speed. Therefore, although in this embodiment for computational efficacy and consideration on the ability of camera we mainly analyze on the forming of drips, theoretically our method also allows analyzing the falling of the drip, the agitation it caused in the liquid below, as well as other numerous conceivable measurements. The signal extracted also does not have to be limited to size or vertical position of the largest component, but can extend to any computable value that exhibits the same periodicity with the dripping process. For example, if due to the drip's reflection the overall brightness (intensity) within a certain area changes periodically, it can also be used to determine the speed of the dripping.

Another question is why we choose erosion to eliminate small spots. There is no inherent reason for choosing erosion over other alternatives; it is just one of the ways to eliminate the unnecessary parts in the image. In the present embodiment we rank connected components by size after erosion, however this can also be done without erosion and simply drops smaller components. We stress again that the processing technique in this illustrational embodiment is just one way to capture its periodicity and other approach that captures the same periodicity will also work. What is of fundamental importance is the determining of the dripping speed by discrete Fourier transform on the extracted signal.

FIG. 4—Determining Speed by Discrete Fourier Transform

In FIG. 3A-3D we have computed two numerical values for each image in the sequence (video): 1) size of the largest component 2) average vertical coordinate of the largest component. Dripping speed can be instantly computed from either of these.

Figure 4A:
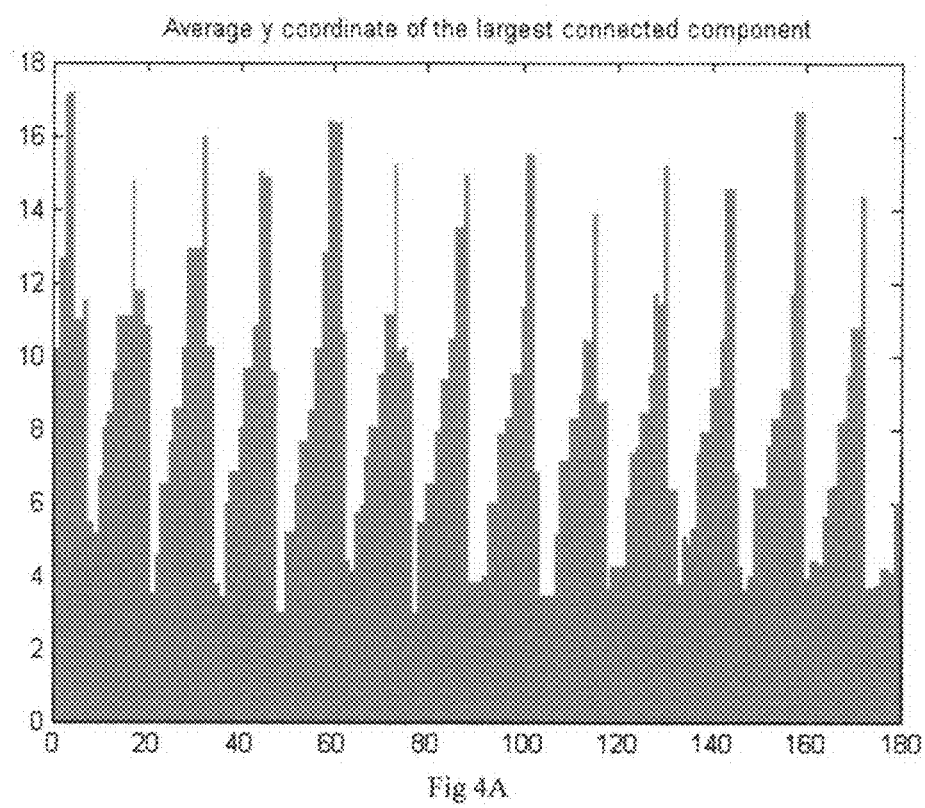

FIG. 4A shows the average vertical coordinate of the largest connected component for a sequence of 180 images. Intuitively the periodicity is evident and one can easily count the number of periods. Within each period the value monotonically increases, consistent with the fact that drips are falling down under gravity.

How can the number of periods be counted? Those lacking knowledge in digital signal processing might be tempted to count the "local peaks" in this result. Sometimes this naïve approach could succeed, but in most cases it is error-prone. The standard approach is to compute the discrete Fourier transform of the signal and find its largest non-constant component.

Figure 4B:
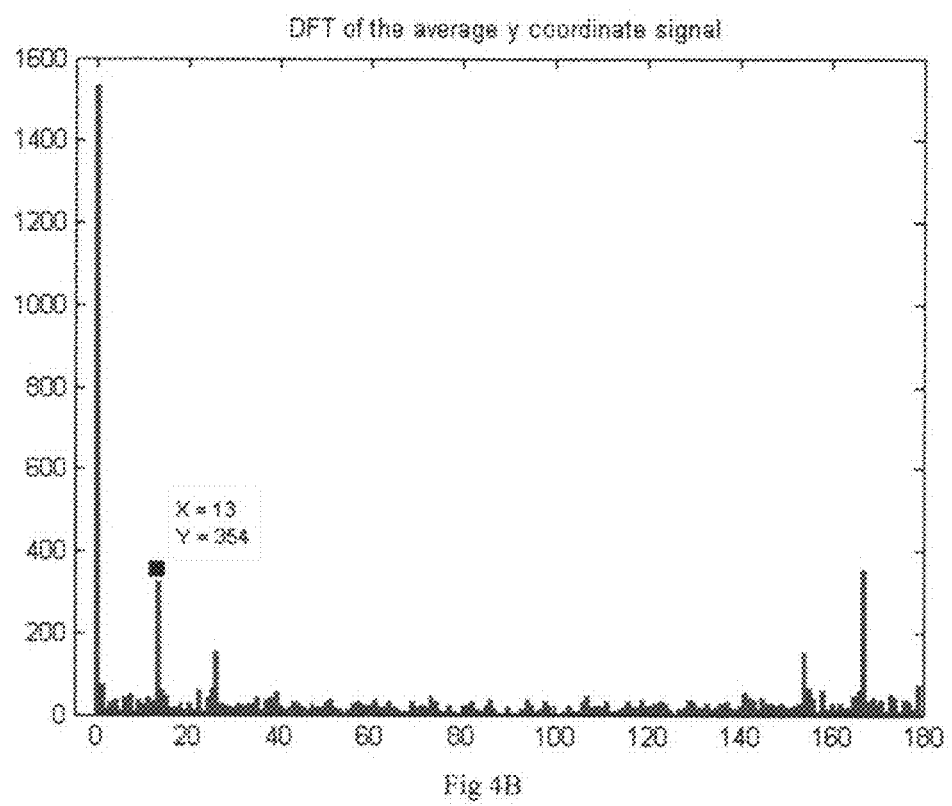

FIG. 4B shows the discrete Fourier transform (DFT) of FIG. 4A. The highest value occurs at zero, which corresponds to the constant average value of the signal, which has no relation with its periodicity. The remaining part is symmetrical and we only need to find the largest value in either of the two halves, and here we choose the left half. We found that coordinates of this largest value is (13, 354), which means 354 is the Fourier coefficient of the strongest component within the signal and it has repeated for 13 times over these 180 images.

Please refer to chapter 8 of [Discrete-Time Signal Processing, 2ed, Prentice Hall, 1999, Oppenheim, Schafer, Buck] for details on the discrete Fourier transform.

The dripping can be calculated immediately:
180/15(frame rate)=12 sec
In 12 sec the signal repeated 13 times
Therefore, the speed is 13×(60/12)=65 drips/min We counted the actual speed of the dripping process from which the video was taken and it was 67 drips/min. This is practically the same as our result since even human counting does not cover exactly integer periods. If the speed is exact and perfectly constant, for 12 seconds there should be 67/5=13.4 drips. Since the discrete Fourier transform takes only integer x values, 13 and 13.4 in this sense are identical.

Figure 4C:
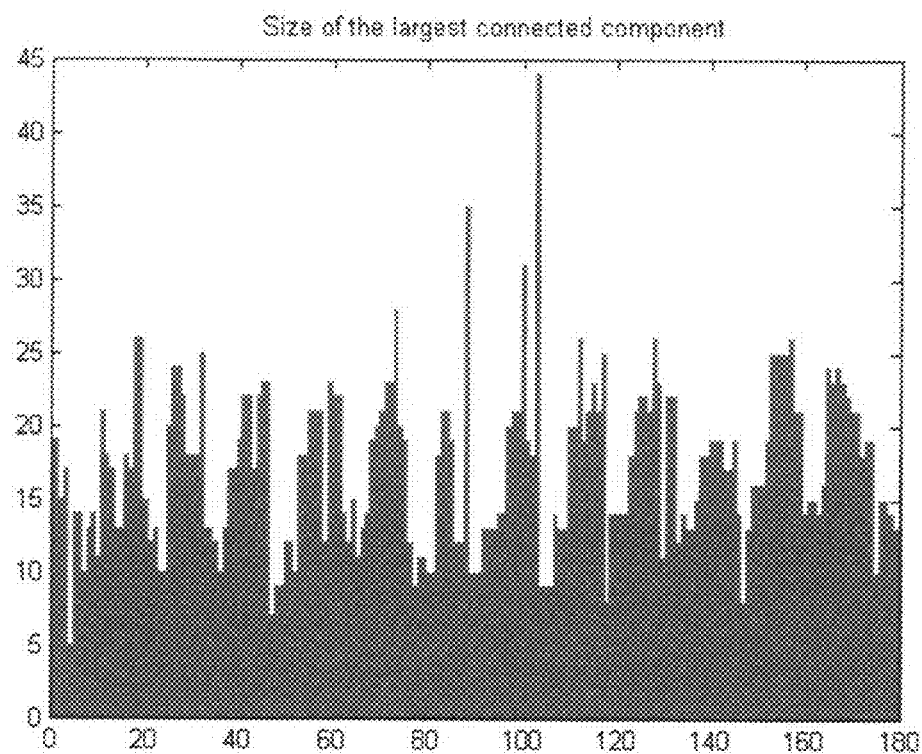
Figure 4D:
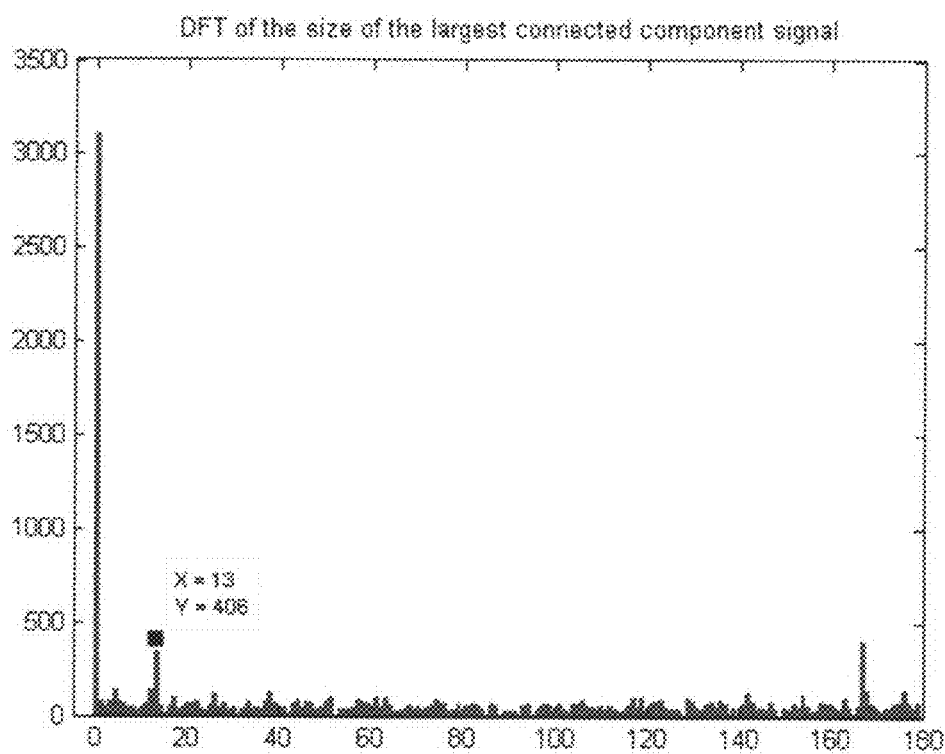

FIG. 4C shows the change in the size of the largest connected component over the same sequence of images. Generally speaking, the size of the largest connected component increases and decreases in each period, corresponding to the forming and falling of drips, but this weak regularity has lots of exceptions. It is also intuitively much more difficult to count the period, let alone by using naïve "local peak" counts. However, discrete Fourier transform in FIG. 4D still makes up our minds for us and recognizes the same 13 repetitions. Therefore, we also get the same result of 65 drips/min as from FIG. 4B.

Figure 4E:
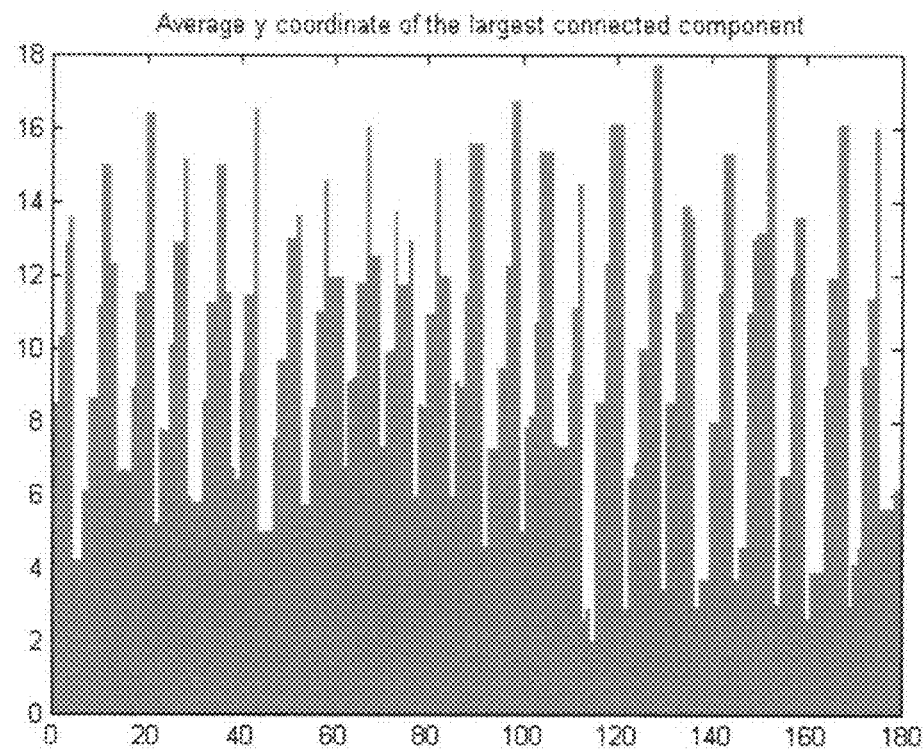
Figure 4F:
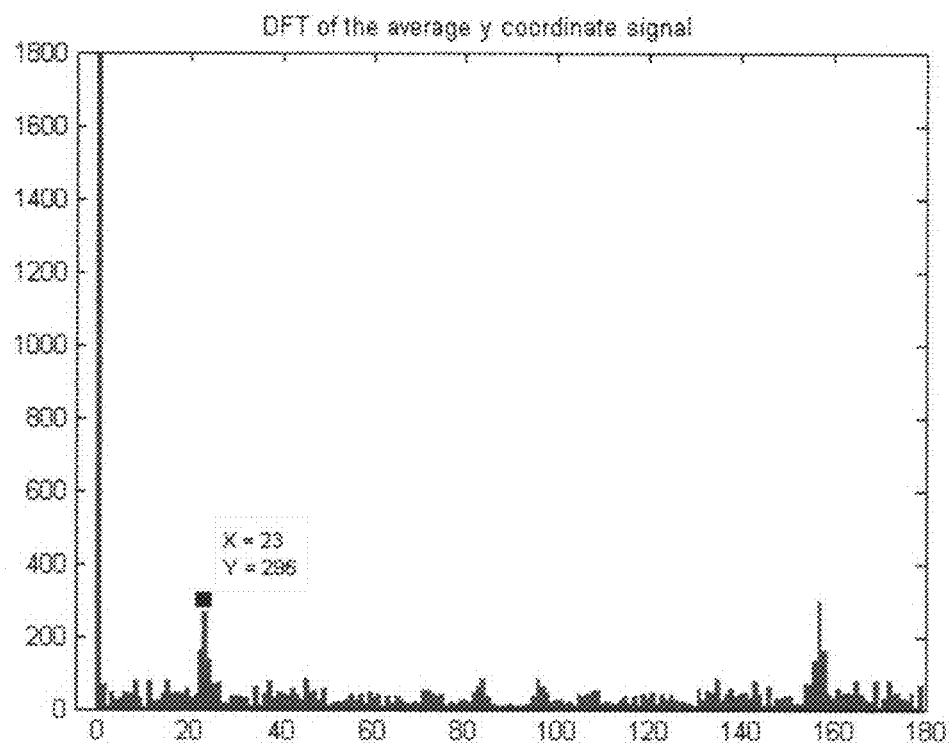

FIG. 4E-4F repeat FIG. 4A-4B for a sequence of 180 images (12 sec) for a dripping process whose actual speed is 117 drips/min by manual count, and our result here is 23×(60/12)=115 drips/min.

Figure 4G:
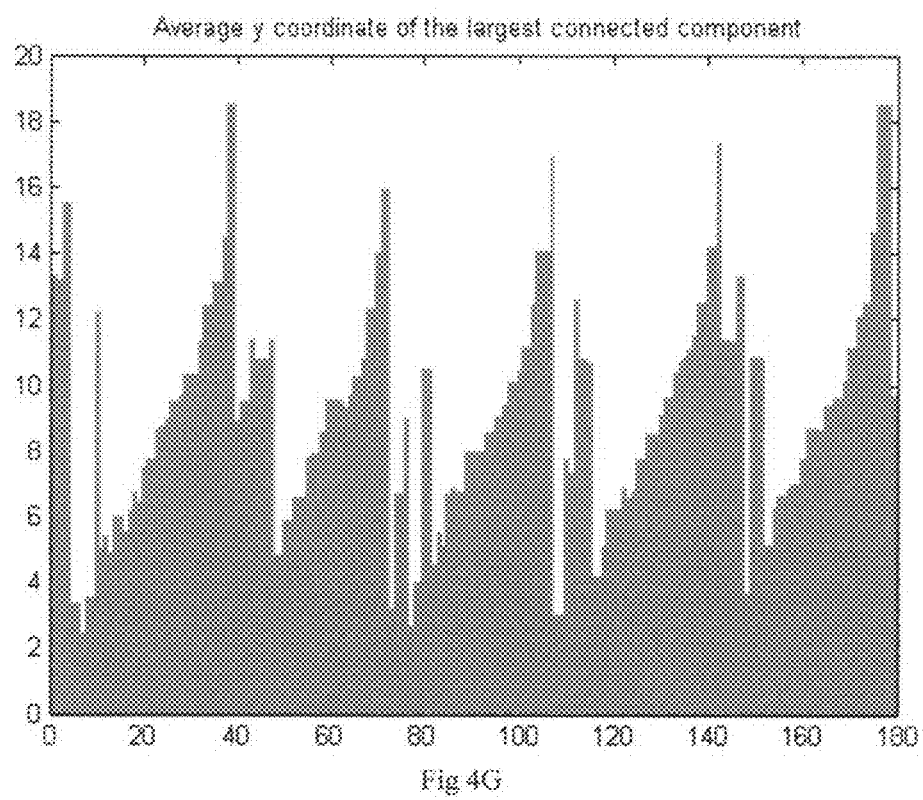
Figure 4H:
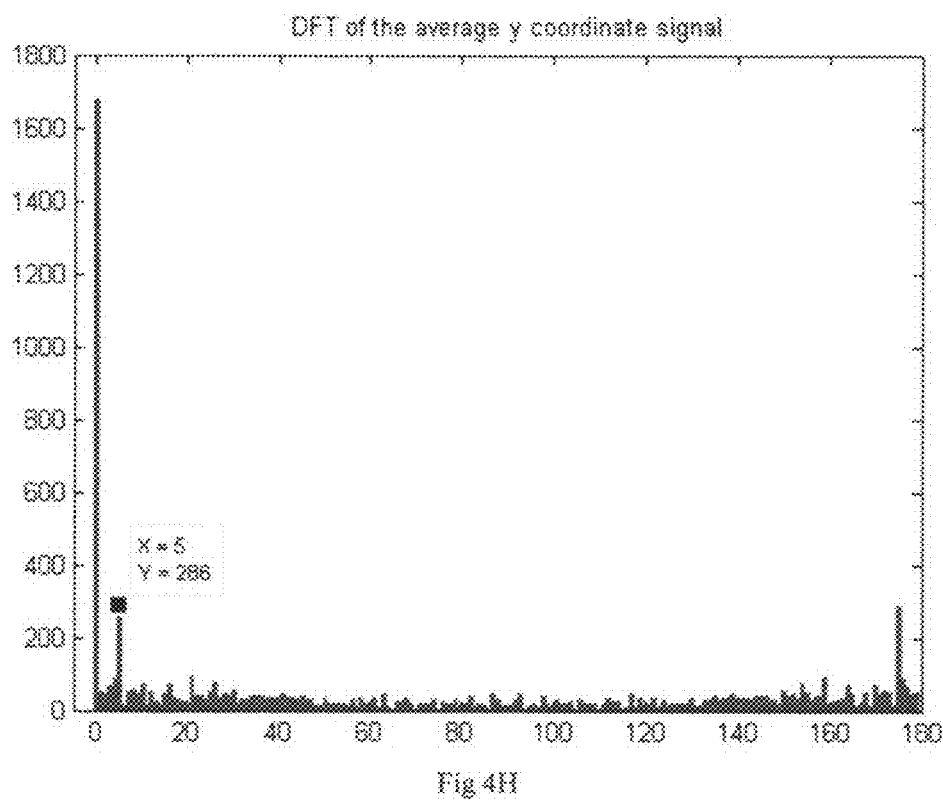

FIG. 4G-4H repeat FIG. 4A-4B for a sequence of 180 images (12 sec) for a dripping process whose actual speed is 26 drips/min by manual count, and our result here is 5×(60/12)=25 drips/min.

We conclude from these three examples here that the speed determined by our method is very accurate. In practice the dripping speed rarely falls below 30 drips/min or exceeds 120 drips/min, and our method works well in the extreme as well as intermediate cases.

The examples also show that comparing with the size of the largest connected component, its average vertical coordinate is relatively a better measurement. But even in the cases of using the size of the largest connected component that intuitively the counting has become difficult, our method still yields accurate result. This is in fact also true for the two extreme cases (26 drips/min and 117 drips/min). This has proved our mathematical assertion that any measurement faithfully capturing the periodicity of the process could be used to determine the dripping speed.

Figure 4I:
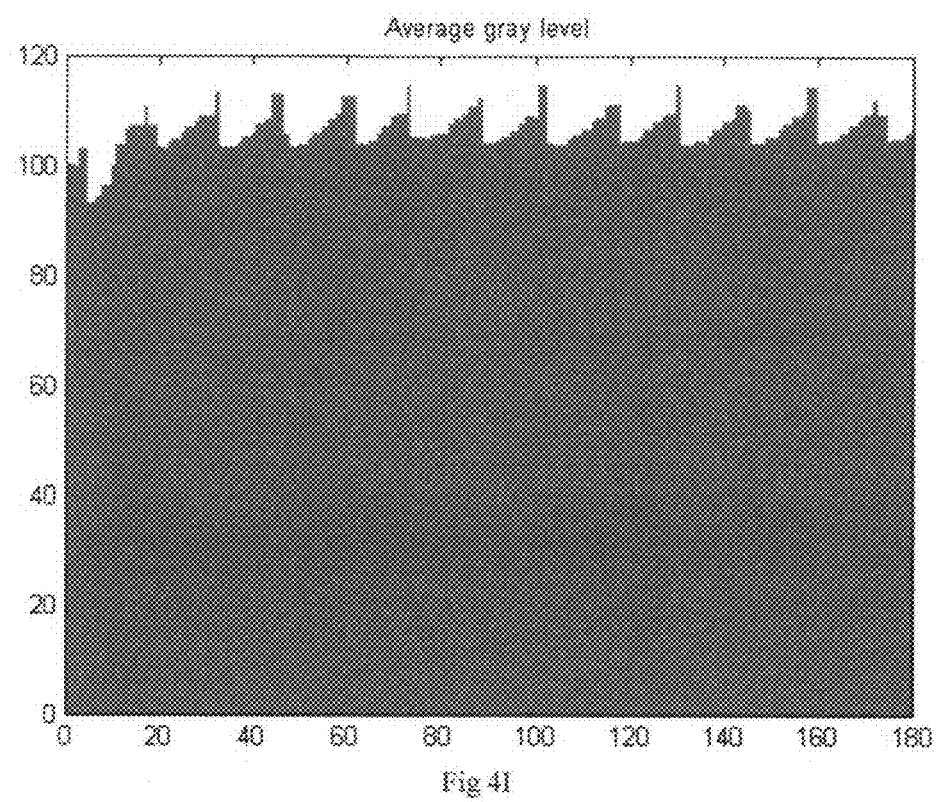
Figure 4J:
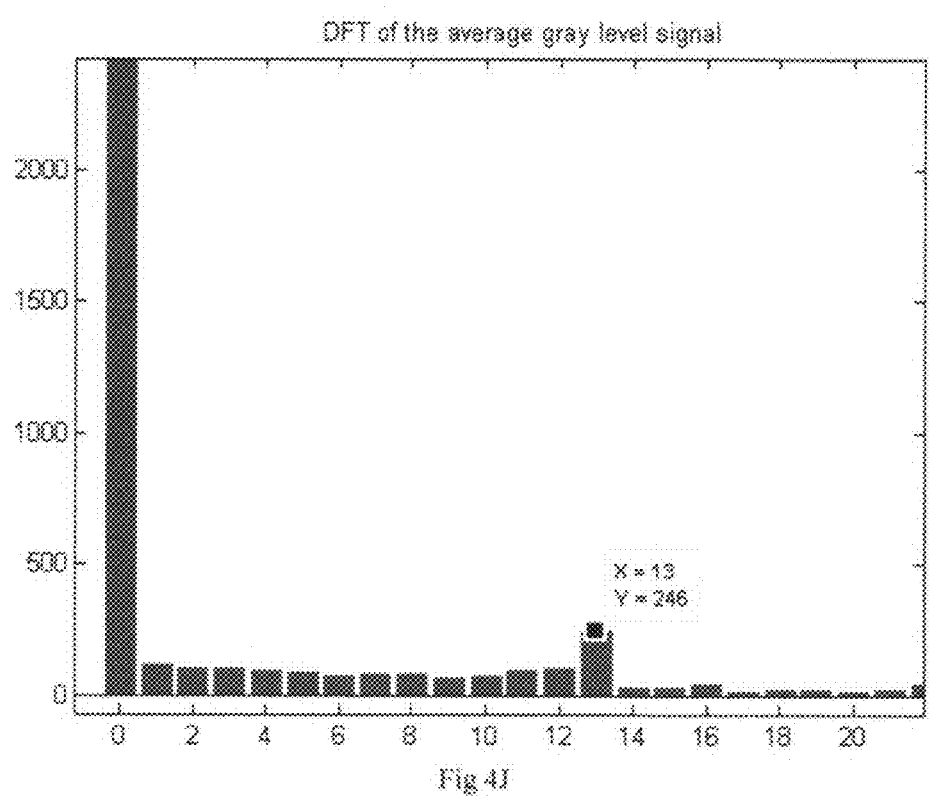

FIG. 4I-4J is a final example to demonstrate the degree of liberty in choosing measurements. In this example the image sequence is the same as that used for FIG. 4A-4D. There is no gradient, no thresholding, no erosion, we simply compute for each image in the sequence the average gray level of all pixels. This simplistic measure still exhibits periodicity as shown in FIG. 4I, and discrete Fourier transform in FIG. 4J recognizes exactly the same number of periods as in FIGS. 4B and 4D.

The purpose of this final example is to stress again that the essence of dripping speed computation is the discrete Fourier transform, rather than any particular measurement. Size and location of the largest component shown above is just one possible implementation and it should be understood only as illustration rather than a limitation. There is a wide spectrum of measurements that can be used to serve our purpose.

FIG. 5—Alarming when Dripping Finishes

We show yet another key functionality of our invention: alarming when the dripping process finishes. Comparing with dripping speed monitoring, this is relatively an easier task.

When the liquid in the IV container depletes the liquid surface in the drip chamber will begin to fall, therefore we need to detect the location of the liquid surface and trigger the alarm when this falling starts.

This is based on edge detection. FIG. 5A is an average image of ten consecutive images in the video. Why averaging images? This is because if we random extracts an image from the video, chances are that it corresponds to the moment that the liquid surface is being agitated by the falling drip, at which time there is oscillatory movement of the surface, making it difficult for the detection. Taking average image significantly reduces this effect, and no matter when the sequence of these consecutive images starts, the liquid surface is always approximately level.

FIG. 5B applies vertical Sobel gradient operator of FIG. 2B to FIG. 5A. Since we are detecting only edges in the horizontal direction, a vertical gradient operator will suffice. There are numerous other methods, including both spatial and frequency domain filtering, to achieve this effect, therefore our choice of Sobel gradient here should only be interpreted as an illustration rather than limitation.

FIG. 5C applies thresholding on FIG. 5B and the threshold level is determined by Otsu's method. This converts gray level image in FIG. 5B to a binary image in FIG. 5C which is amenable to computation.

FIG. 5D shows the counting, within each row of FIG. 5C, of the maximum number of consecutive points. It is clear that high value of this count corresponds to significant horizontal line segments and the highest values concentrate at the location of the edge and the bottom of the chamber.

There are several "high counts", but which one is the location of the surface? One might choose the upper one since the liquid surface cannot be lower than the bottom of the chamber. Criteria like this are plausible but not always sound. We need more reliable criteria to ensure safety in medical practice.

We assume the actual measurements of the chamber is known, and since it is fixed in the containing box (see FIG. 1) and the camera is fixed, the location of the top and bottom part of the chamber in FIG. 5C is also known. Therefore, we do not bother to count maximum consecutive points at and beyond these limits and this simplification yields FIG. 5E. The single highest value in FIG. 5E corresponds to location of the liquid surface. In FIG. 5F the detected surface location is marked together with the known location of the bottom of the chamber. When they become close, the device will alarm the patient and nurses.

How can we know the exact physical measurement of the chamber? This reminds us of an unsolved problem mentioned in the description of FIG. 2: How to determine the location of the small window in the image where the analysis is performed on? We said there that this is to be solved by using barcode, and FIG. 6 discusses how this is done, together with the new problem encountered here.

FIG. 6—Using Barcode

FIG. 6A shows the example of a Barcode implementation which is called Universal Product Code (UPC). Black bar represent 1 and White bar represent 0. At the top, middle and bottom there are longer bars representing distinct bit patterns of 101, 01010 and 101 respectively, and the program can detect the width of a single (basic) bar from the topmost or the bottommost. All those bars that appear wider than a basic bar are concatenation of basic bars.

The image of the barcode can be captured, and the program will scan downwards (or upwards) to find the first consecutive black width, using it width in pixels as the basis for further computation. It will then keep on scanning downwards, measuring the length of each black and white width in terms of the basic width (dividing by that), discarding the top, middle and bottom bit patterns (Please refer to UPC standard for more on its detail.) Every decimal digit is represented by seven bits and there are six decimal digits both before the middle bits pattern and after that. The program will convert a black basic width to 1 and a white basic width to 0, generating the bit pattern for each decimal digit as shown in FIG. 6B.

The bit pattern in FIG. 6B will then be decoded to the digits it represents under the corresponding barcode scheme. Of course, we give the above example in UPC scheme to illustrate the concept, and we can design a dedicated coding scheme solely for IV monitoring use.

These digits can be used to represent arbitrary information:
1. There can be a standard for IV container barcode within a certain domain (a hospital, a nation, or internationally) such that different bit of digits represent different information, in much the same way as a computer file. For example, the first five digits represent the drug type, the next three represent the volume, the next three for speed requirement, etc. Especially in the case when a global standard has been established, this standard can be stored in the internal memory of the hardware and the monitoring device can work independently without querying the information from a central server.
2. One can also use non-standard code, such as designed by a hospital for use internally. In this case, it is more convenient for the monitoring device to send the code to a central server and receive the decoded result from that.

The label can be printed on a sticker-like surface by the manufacturer of the drug or the hospital. When the drug is being administrated the label will be put onto the interior wall of the box as shown in FIG. 1. Since it is put at a fixed area, the program will not need to find the position of the label in the acquired image by any recognition algorithm.

With the information provided by the barcode, type and exact measurements of the drip chamber can be known, thereby answering the questions posed in the description for FIG. 2 and FIG. 4. These information allows the device to know which part of the image it should perform its analysis on, and in which area should the liquid surface be detected.

In addition to these two information, the use of barcode can also convey volume of the drug to the program. Since dripping speed can be automatically monitored and the volume is known, the administrated and remaining amount of drug can also be calculated. Based on the current dripping speed the device can also estimate the remaining time for the dripping to finish. This could save countless amount of time for patients and nurses worldwide.

We use barcode to provide information to the monitoring program and it enhances the functionality of the original configuration. There can also be 2D barcode as well as other coding schemes, which can all be processed with the captured image. Therefore use of specific examples in FIG. 6 should be understood as an illustration rather than any limitation.

Acknowledgement

We make here both a statement and an acknowledgement that as a choice of programming environment for the illustration, we used MATLAB® 7.6.0.324 (R2008a) of The Mathworks, Inc. Embodiments of this invention in practice can use any suitable programming language to implement the logic.

What is claimed is:
1. An apparatus for IV dripping speed monitoring, comprising:
   a containing box that holds the drip chamber;
   an image capturing device, to capture video of the dripping process;
   a processing unit to perform analysis of the captured video;
   wherein said processing unit monitors the dripping speed based on a signal which is obtained from analyzing the image sequence, wherein the elements of the signal are influenced or driven by the dripping process; and
   wherein the dripping speed is determined by performing Fourier analysis methods on the signal.

2. The apparatus of claim 1, wherein the Fourier analysis methods include a discrete Fourier transform.

3. The apparatus of claim 1, wherein the containing box has light sources arranged inside; and part or all of the containing box is made of non-transparent material.

4. A method for obtaining a characteristic value of a drip from images of an IV dripping chamber, comprising:
   determining connected components indicative of drips within the image using a connectivity criteria;
   ranking the connected components according to a numerical measure of their respective size;
   identifying a connected component of a certain rank from the ranked connected components; and
   computing a characteristic value, indicative of the vertical location of the drips during the dripping process, for the identified connected component.

5. The method of claim 4, wherein the identified component is the one of the largest size or largest connected component.

6. The method of claim 4, wherein the characteristic value is the identified component's average pixel vertical location.

7. The method of claim 4, further comprising: processing the images with techniques including image enhancement, thresholding, or reducing or removing relatively smaller parts in the image, or combinations thereof before applying connectivity criteria.

8. The method of claim 7, further comprising: combining said techniques in an order beginning with image enhancement and ending with removal or reduction of the smaller parts of the image.

9. The method of claim 7, wherein the image enhancement techniques include the use of a Sobel operator, a Prewitt operator, or a Laplacian operator, or combinations thereof.

10. The method of claim 7, wherein the thresholding techniques include the use of Otsu thresholding, automatic thresholding, or thresholding using a predetermined value.

11. The method of claim 7, wherein the reduction or removal of relatively smaller parts in the image include the use of erosion or removing parts for which the numerical measure of its size is below a threshold.

12. A method for obtaining a characteristic value of a drip from images of an IV dripping chamber, comprising:
   processing the image with techniques including image enhancement, thresholding, or reducing or removing relatively smaller parts in the image, or combinations thereof;
   determining connected components indicative of drips within the processed image using a connectivity criteria;
   ranking the connected components according to a numerical measure of their respective size;
   identifying a connected component of a certain rank from the ranked connected components, wherein the identified component is the one of the largest size or largest connected component;
   computing a characteristic value, indicative of the vertical location of the drips during the dripping process, for the identified connected component; and
   wherein the image enhancement techniques include the use of a Sobel operator, a Prewitt operator, or a Laplacian operator, or combinations thereof.

13. The method of claim 12, wherein the thresholding techniques include the use of Otsu thresholding, automatic thresholding, or thresholding using a predetermined value.

14. The method of claim 12, wherein the reduction or removal of relatively smaller parts in the image include the use of erosion or removing parts for which the numerical measure of its size is below a threshold.

15. A method for determining IV dripping speed with Fourier analysis methods, comprising:

capturing a sequence of images of an IV dripping sequence, using an image capturing device, wherein at least some of the images contain part or all of the dripping chamber;

processing at least some temporally evenly spaced images and extracting from each image a numerical value that is influenced or driven by the dripping process and storing the values into a vector;

using a Fourier analysis method to determine periodicity in the stored vector; and using the periodicity combined with the temporal spacing of the images to calculate the dripping speed.

16. The method of claim 15, wherein the Fourier analysis method further comprises, performing a discrete Fourier transform on the stored vector;

indexing the total spectrum component;

finding the fourier component of the largest magnitude, excluding at index zero which corresponds to the DC component in the vector, in either the entire left or right of the spectrum, or an interval of the left or right half of the spectrum whose length is smaller than the full length of the selected half, provided that the interval is wide enough to cover the Fourier component whose index is indicative of the vector's periodicity;

storing said index;

using the index as the number of periods; and calculating the dripping speed by utilizing the periodicity information and the temporal distance of the images from which the vector elements were computed.

17. A method for determining IV dripping speed comprising:

capturing a sequence of images of an IV dripping sequence, using an image capturing device, wherein at least some of the images contain part or all of the dripping chamber;

processing some temporally evenly spaced images and extracting from each image a numerical value that is influenced or driven by the dripping process and storing the values into a vector, wherein the extraction is of the drip trajectory less than 4 cm from the lowest part of the dripping mouth from which the drip comes out;

applying frequency estimation methods to determine periodicity in the stored vector; and calculating the dripping speed by utilizing the periodicity information and the temporal distance of the images from which the vector elements were computed.

\* \* \* \* \*